(12) United States Patent
Swamy

(10) Patent No.: US 10,063,179 B2
(45) Date of Patent: *Aug. 28, 2018

(54) ENERGY SAVING METHOD FOR USE WITH ACTIVE PWM RECTIFIERS IN REGENERATIVE DRIVES

(71) Applicant: Yaskawa America, Inc., Waukegan, IL (US)

(72) Inventor: Mahesh M. Swamy, Gurnee, IL (US)

(73) Assignee: Yaskawa America, Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,871

(22) Filed: Nov. 30, 2015

(65) Prior Publication Data

US 2016/0079905 A1 Mar. 17, 2016

Related U.S. Application Data

(62) Division of application No. 13/973,381, filed on Aug. 22, 2013, now Pat. No. 9,318,992.

(51) Int. Cl.
| | |
|---|---|
| *G05B 11/28* | (2006.01) |
| *H02P 27/08* | (2006.01) |
| *H02P 27/16* | (2006.01) |
| *H02P 23/06* | (2016.01) |
| *H02P 25/18* | (2006.01) |
| *H02P 29/02* | (2016.01) |

(52) U.S. Cl.
CPC ............. *H02P 27/08* (2013.01); *H02P 23/06* (2013.01); *H02P 25/18* (2013.01); *H02P 27/16* (2013.01); *H02P 29/021* (2013.01)

(58) Field of Classification Search
CPC .. H02M 1/4216; H02M 1/4208; H02M 1/083; H02M 1/12
USPC ................. 318/599, 811, 727, 801
See application file for complete search history.

(56) References Cited

U.S. PATENT DOCUMENTS

| | | | | |
|---|---|---|---|---|
| 5,499,178 A | * | 3/1996 | Mohan | H02J 3/01 307/105 |
| 5,646,498 A | * | 7/1997 | Lipo | H02M 1/12 318/800 |
| 5,661,390 A | * | 8/1997 | Lipo | H02M 1/12 318/492 |
| 5,905,642 A | * | 5/1999 | Hammond | H02M 1/12 363/37 |
| 6,163,472 A | * | 12/2000 | Colby | H02M 1/4216 363/127 |

(Continued)

*Primary Examiner* — Rina Duda
(74) *Attorney, Agent, or Firm* — Wood, Phillips, Katz, Clark & Mortimer

(57) ABSTRACT

As described herein, a drive circuit for a three phase AC motor comprises an AC/AC converter. The converter has an input for receiving multiphase AC power from an AC source and converting the AC power to variable voltage and variable frequency from the AC source for driving the AC motor. A filter circuit is connected to the AC/AC converter and comprises at least one inductor per phase and at least one capacitor per phase. The capacitors are connected in a broken wye configuration with one side connected to one of the inductors and an opposite side connected via a three phase diode bridge rectifier to a switch. The switch is controlled by a converter control to selectively open or short a neutral point of the broken wye capacitor configuration.

12 Claims, 6 Drawing Sheets

(56) References Cited

U.S. PATENT DOCUMENTS

| | | | | |
|---|---|---|---|---|
| 6,567,283 B2* | 5/2003 | Welches | ............... | H02M 1/4208 363/48 |
| 6,847,185 B2* | 1/2005 | Kume | .................... | H02P 25/188 318/732 |
| 7,274,576 B1* | 9/2007 | Zargari | ................ | H02M 5/4585 363/35 |
| 7,474,081 B2* | 1/2009 | Colombi | ............. | H02M 1/4216 323/266 |
| 7,518,891 B2* | 4/2009 | Wei | ....................... | H02M 1/126 363/123 |
| 7,599,196 B2* | 10/2009 | Alexander | .......... | H02M 3/1582 363/124 |
| 7,602,622 B2* | 10/2009 | Wei | ......................... | H02M 1/12 363/37 |
| 7,778,045 B2* | 8/2010 | Alexander | .......... | H02M 3/1582 363/124 |
| 7,848,121 B2* | 12/2010 | Kojori | ..................... | H02M 1/32 363/37 |
| 7,990,097 B2* | 8/2011 | Cheng | ................. | H02M 5/4585 318/800 |
| 8,188,693 B2* | 5/2012 | Wei | ....................... | H02M 1/083 318/376 |
| 2005/0174812 A1* | 8/2005 | Wu | ....................... | H02M 5/458 363/39 |
| 2008/0074074 A1* | 3/2008 | Skibinski | .............. | H02M 7/003 318/800 |

* cited by examiner

US 10,063,179 B2

ENERGY SAVING METHOD FOR USE WITH ACTIVE PWM RECTIFIERS IN REGENERATIVE DRIVES

CROSS-REFERENCE TO RELATED APPLICATIONS

This application is a divisional of application Ser. No. 13/973,381 filed Aug. 22, 2013.

FEDERALLY SPONSORED RESEARCH OR DEVELOPMENT

Not Applicable.

MICROFICHE/COPYRIGHT REFERENCE

Not Applicable.

FIELD OF THE INVENTION

This application relates to drive circuits including an AC/AC converter and LC filter and, more particularly, to an energy saving method which selectively opens or shorts a neutral point of a broken wye capacitor.

BACKGROUND

Most rectifier front-end voltage source inverters do not allow power to flow back into the input AC supply. Such motor drives are said to operate either in the first quadrant or in the third quadrant as depicted in FIG. 1. However, in many applications, it is required to convert mechanical energy to electrical energy and ultimately channel it back to the AC supply. Such motor drives are said to be able to operate in all the four quadrants. When the duration of regeneration is short and the energy that needs to be regenerated is modest, dynamic braking units can be employed. In such cases, the motor drive operates in the second quadrant where the load is still rotating in the same direction but is being decelerated by the negative torque produced by the commanded frequency, which results in negative slip operation for induction motors (IM) or negative torque operation in permanent magnet (PM) motors. The mechanical energy is converted into electrical energy but this energy is dissipated as heat and hence such an operating mode is called a braking mode of operation.

Diode front-end drives operate only in the 1st and 3rd quadrants with marginal tolerance to operate in the second quadrant. On the other hand, active PWM converter front-end drives 10, see FIG. 2, also known as "line regenerative" drives can operate in all four quadrants. The most popular areas of use for active PWM converter drives is in wind power generation systems, large solar farms connected to the AC grid, elevators and escalators, pump jacks used in oil fields, and centrifuges. Here, the mechanical energy stored in the rotating load or photo energy from solar cells is converted into electrical energy and fed back into the AC grid.

Four-quadrant operation requires actively controlling the flow of power into and out of the AC supply 18 by channeling the current appropriately into the corresponding phases. For regeneration operation, the available electrical power is in the form of a DC voltage while the load is an AC power supply. The switches 20 in the PWM converter 12 perform the function of an inverter similar to the PWM inverter 14 at the output stage of the motor-drive unit. In other words, the voltage waveform at the AC source input terminal of the PWM converter 12 is a sinusoidal PWM voltage waveform with a sinusoidal fundamental component. However, the similarity ends there. In case of a typical motor-drive output stage, the load is an induction motor 16 and the voltage waveform is not critical. The motor 16 behaves like a large smoothing inductor and responds only to the fundamental component in the output voltage waveform. On the other hand, in case of the PWM converter 12, the load, looking out from the PWM converter 12 in to the supply, is not an induction motor. It is the sinusoidal AC source 18, typically of low impedance. Hence, the PWM waveform cannot be directly impressed across the sinusoidal AC supply, because large amplitudes of ripple currents would then flow into the AC source 18, which can potentially damage the semiconductor switches 20 in the PWM converter 12. For this reason, input LCL filters 22 are used to filter the switching frequency ripple. The main inductor that filters the PWM ripple current can be likened to the leakage inductances of electric motors. The remaining filter components are provided to ensure that the input sinusoidal source voltage remains ripple free.

During motoring, power flows from the input AC side to the output load side. If standard diode rectifiers were to be employed then the input diodes would not conduct until the instantaneous value of the input supply voltage went higher than the voltage across the DC bus capacitor 24. The conduction would cease soon after the input supply voltage went below the DC bus capacitor voltage. This would result in a pulsating current waveform, which is familiar to most. Since the PWM converter 12 is equipped with active switches 20, it is beneficial to force current to flow into and out of the AC source 18 even when the input supply voltage is lower than the DC bus voltage across the capacitor 24. This would result in continuous current flow and hence lower total current harmonic distortion. The concept can be understood if one disregards the presence of an AC source and assumes a pure inverter action forcing current to flow into a motor load with significant leakage inductance. The only difference is that in a typical inverter, the output can be of any desired frequency within the limits of the inverter, the motor, and the associated mechanical system, while in this case, the output frequency is fixed at the supply frequency of either 50 Hz or 60 Hz. The leakage inductance of the motor is replaced by an external inductor $L_D$ as explained earlier.

In a PWM converter 12, the input current has a different phase relationship with the input supply voltage depending on the quadrant of operation. In the first and third quadrants, the input line current is in phase with the line-neutral voltage, indicating positive power flow from the AC source 18 into the motor load 16 via the PWM converter 12. In the second and fourth quadrants, the line current is 180° phase-shifted with respect to the line-neutral voltage, indicating negative power flow or power flow from the load side into the AC source 18 via the PWM converter 12.

An added advantage of using a PWM converter front-end system is that during its operation, current can be made to flow into or out of the AC supply system at appropriate times in a continuous manner. This feature eliminates pulsating current that is typical of diode based AC to DC rectifiers feeding a large DC bus capacitor. By using an input LCL filter 22, the ripple in the input current is minimized resulting in almost sinusoidal current operation. The ability to shape the input current plays an important and significant role in channeling the mechanical energy, either from overhauling loads, dynamometers, or wind turbines, safely and reliably into the AC grid. The current and voltage waveforms can be made to comply with IEEE 519-1992 regulations by choosing an appropriately sized input LCL filter 22.

Whenever a capacitor based filter is introduced into a power system, there is bound to be interaction between the external harmonic source and the capacitive filter. Since in the LCL 22 filter being used here, the capacitor $C_Y$ is an important and integral part of the filter 22, it often interacts with pre-existing harmonics in the power system. The pre-existing harmonic source could be due to other VFDs on the system or other PWM rectifiers connected to other loads on the same power source. In order to study the interaction of external harmonic source on the LCL filter 22, a single-phase equivalent circuit of the LCL filter 22 is developed. The single-phase equivalent circuit is derived from the viewpoint of the external harmonic source. The sequence of derivation is shown in FIG. 3.

In FIG. 3, all voltage sources are shorted. The entire LCL filter 22 is assumed to be powered from one single-phase harmonic source, VH. The harmonic source VH is assumed to be applied across line and neutral. DC voltage source and the other phase voltages are shorted to derive the single-phase equivalent circuit. The systematic progression of the single-phase equivalent circuit is shown in FIG. 3.

From FIG. 3, the expression for Z1 is derived next. The equivalent circuit is analyzed to compute the resonant conditions based on the filter component values.

$$Z_1 = j\omega_h \cdot L_G + \frac{2 \cdot j\omega_h \cdot L_D \cdot (2/(j\omega_h \cdot C_Y))}{2 \cdot j\omega_h \cdot L_D + (2/(j\omega_h \cdot C_Y))} \quad (3)$$

$$Z_1 = j\omega_h \cdot L_G + \frac{2 \cdot j\omega_h \cdot L_D}{1 - \omega_h^2 \cdot L_D \cdot C_Y}$$

$$Z_1 = j\omega_h \cdot \left( \frac{L_G \cdot (1 - \omega_h^2 \cdot L_D \cdot C_Y) + 2 \cdot L_D}{1 - \omega_h^2 \cdot L_D \cdot C_Y} \right)$$

$$\frac{Z_1}{2} = j\omega_h \cdot \left( \frac{L_G \cdot (1 - \omega_h^2 \cdot L_D \cdot C_Y) + 2 \cdot L_D}{2 \cdot (1 - \omega_h^2 \cdot L_D \cdot C_Y)} \right)$$

$$Z_H = j\omega_h \cdot \left( \frac{3 \cdot L_G \cdot (1 - \omega_h^2 \cdot L_D \cdot C_Y) + 2 \cdot L_D}{2 \cdot (1 - \omega_h^2 \cdot L_D \cdot C_Y)} \right)$$

From equation (3), it is interesting to see that the value of the impedance ZH looking in from the AC source can go to zero when the numerator goes to zero. Equating the numerator in (3) to zero, yields the following results:

$$0 = 3 \cdot L_G \cdot (1 - \omega_h^2 \cdot L_D \cdot C_Y) + 2 \cdot L_D \quad (4)$$

$$\omega_h^2 = \frac{2}{3 \cdot L_G \cdot C_Y} + \frac{1}{L_D \cdot C_Y}$$

$$\omega_h^2 = \frac{1}{L_{EFF} \cdot C_Y} \text{ where } L_{EFF} \text{ is defined as:}$$

$$L_{EFF} = \frac{3 \cdot L_G \cdot L_D}{2 \cdot L_D + 3 \cdot L_G}$$

The possibility of resonance requires methods to damp it. Since the capacitor $C_Y$ is involved in the resonance, adding a resistor $R_D$ (not shown) in series with the capacitor $C_Y$ can help dampen oscillations. The value of the series resistor for an over-damped or critically damped system is derived next. The voltage equation for the equivalent loop consisting of $L_{EFF}$, $C_Y$ and $R_D$ is:

$$v = L_{EFF} \cdot \frac{di}{dt} + i \cdot R_D + \frac{1}{C_Y} \cdot \int i \cdot dt \quad (5)$$

Above equation has a natural response solution and a forced response solution. Naural response part will yield the conditions for choice of damping resistor $$0 = \frac{d^2 i}{dt^2} + \frac{R_D}{L_{EFF}} \cdot \frac{di}{dt} + \frac{i}{L_{EFF} \cdot C_Y}$$

$$0 = \left( D^2 + \frac{R_D}{L_{EFF}} \cdot D + \frac{1}{L_{EFF} \cdot C_Y} \right) \cdot i$$

$$D_1, D_2 = \frac{-R_D}{2 \cdot L_{EFF}} \pm \sqrt{\left( \frac{R_D^2}{4 \cdot L_{EFF}^2} - \frac{1}{L_{EFF} \cdot C_Y} \right)}$$

$$R_D^2 \geq \frac{4 \cdot L_{EFF}}{C_Y} \text{ yields an over-damped or critically damped system.}$$

From (5), the value of the damping resistor $R_D$ in series with the filter capacitor $C_Y$ should be greater than or equal to the critically damped resistance value given by: $2 * \sqrt{(L_{EFF}/C_Y)}$.

It should be noted that adding a resistor in series with the filter capacitor $C_Y$ will increase the power loss in the filter, which can reduce the overall system efficiency. This may be a small price to pay to ensure that an external harmonic disturbance does not cause nuisance trips in the PWM converter 12. In this described topology (a resistor in series with the resonating capacitor), the effectiveness of the circuit is reduced since the series resistor adds impedance to the ripple current, which diminishes the capability of the circuit to shunt the ripple current. Further, the value of the series resistor should be large enough to provide sufficient damping but at the same time should be small to absorb the ripple current. This contradictory requirement makes the choice of a suitable capacitor-resistor combination difficult. Compromise may need to be made while selecting the value of the damping resistor either to improve damping or to reduce power loss in the damping resistors.

From the LCL filter topology shown in FIG. 2, it can be seen that a current path exists between the inductor $L_G$ and the capacitor $C_Y$ even when the PWM converter switches 20 are OFF. This is a major source of power loss in the filter inductor $L_G$ and a damping resistor $R_D$, if one is included. In addition, the insertion of a low pass filter in the form of $L_G$-$C_Y$ can create unwanted resonance conditions on the power grid, depending on other nonlinear loads preexisting on the grid. In view of the above situation, one can say that the standby power loss can become an important part of the overall grid power wastage when numerous PWM rectifiers in the form of wind power generating units or overhauling loads like in oil beam pumps form a major part of the power system.

This application is directed to improvements in use of LC filters to provide energy savings.

SUMMARY

As described herein, an energy saving method is provided for use with, for example, active PWM rectifiers in regenerative drives.

There is disclosed in accordance with one aspect, a drive circuit for a three phase AC motor comprising an AC/AC converter. The converter has an input for receiving multi-phase AC power from an AC source and converting the AC power to variable voltage and variable frequency from the AC source for driving the AC motor. A filter circuit is connected to the AC/AC converter and comprises at least one inductor per phase and at least one capacitor per phase. The capacitors are connected in a broken wye configuration with one side connected to one of the inductors and an opposite side connected via a three phase diode bridge rectifier to a switch. The switch is controlled by a converter control to selectively open or short a neutral point of the broken wye capacitor configuration.

It is a feature that the switch is turned off if the converter is not in a run mode.

It is another feature that the switch provides a select power loss for damping.

It is a further feature that the filter circuit comprises a damping resistor between the switch and a DC side of the diode bridge.

It is a further feature that the filter is connected between the AC source and the AC/AC converter.

It is another feature that the filter is connected between the AC/AC converter and the motor.

It is an additional feature that the AC/AC converter comprises a voltage source inverter.

It is yet another feature that the filter circuit comprises an input harmonic filter.

It is yet another feature that the filter circuit comprises capacitor banks and each capacitor bank is connected via a three phase diode bridge rectifier to a switch.

It is another feature that the switch is turned off responsive to fault conditions.

It is yet another feature that the filter comprises an output sine wave filter.

It is an additional feature that the AC/AC converter comprises a matrix converter.

There is also disclosed herein the method for saving energy with active PWM rectifiers in a regenerative drive. The method comprises providing a voltage source inverter including an active PWM rectifier having an input for receiving multi phase AC power from an AC source and converting the AC power to DC power at an output and a PWM inverter for converting the DC power to AC power to drive a motor, the PWM rectifier and PWM inverter being controlled to control flow of power into and out of the AC source; and providing a filter circuit connected between the AC source and the voltage source inverter and comprising at least one inductor per phase and at least one capacitor per phase, the capacitors connected in a broken wye configuration with one side connected to one of the phases and an opposite side connected via a three phase diode bridge rectifier to a switch; and controlling the switch to selectively open or short a neutral point of the capacitor broken wye configuration.

There is disclosed in accordance with another aspect a drive circuit for a three phase AC motor comprising an AC/AC converter having an input for receiving multiphase AC power from an AC source and converting the AC power to variable voltage and variable frequency from the AC source for driving the AC motor. An input filter circuit is connected between the AC source and the AC/AC converter and comprises at least one inductor per phase and at least one capacitor per phase. The capacitors are connected in a broken wye configuration with one side connected to one of the phases and an opposite side connected via a three phase diode bridge rectifier to a switch. The switch is controlled by a converter control to selectively open or short a neutral point of the capacitor broken wye configuration.

There is disclosed in accordance with a further aspect, a drive circuit for a three phase AC motor comprising an AC/AC converter having an input for receiving multiphase AC power from an AC source and converting the AC power to variable voltage and variable frequency from the AC source for driving the AC motor. An output filter circuit is connected between the AC/AC converter and the motor and comprises at least one inductor per phase and at least one capacitor per phase. The capacitors are connected in a broken wye configuration with one side connected to one of the phases and an opposite side connected via a three phase diode bridge rectifier to a switch. The switch is controlled by a converter control to selectively open or short a neutral point of the capacitor broken wye configuration.

Other features and advantages will be apparent from a review of the entire specification, including the appended claims and drawings.

DETAILED DESCRIPTION

Figure 4:
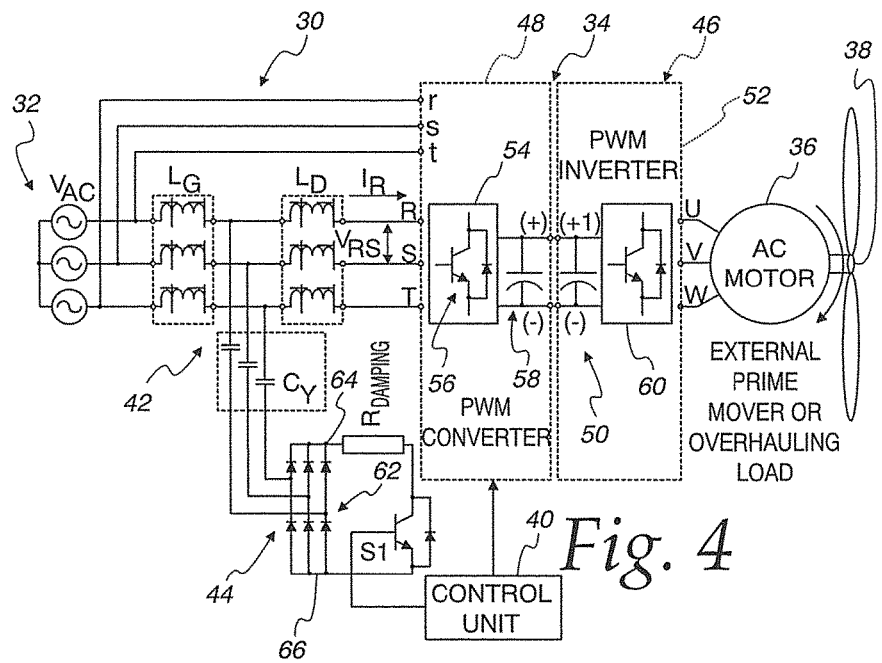
FIG. 4 is a schematic for a circuit providing an energy saving method for use with an active PWM rectifier in a regenerative drive.

Referring to FIG. 4, a motor drive system 30 is illustrated. The motor drive system 30 receives three phase power from an AC source 32 and includes a variable frequency drive (VFD) 34 for developing variable voltage and variable frequency power for driving an induction motor 36 operating a prime mover 38. A control unit 40 controls the VFD 34. The control unit 40 is not described herein in detail as it does not itself form part of the invention, other than as particularly described below. The AC source 32 may comprise a drive or the like developing three phase AC power which is connected via an LCL filter 42 to the VFD 34. The LCL filter 42 comprises a three phase inductor $L_G$ in series with a three phase inductor $L_D$ to the input of the VFD 34. A three phase capacitor $C_Y$ is connected in a broken wye configuration with one side connected between the inductors $L_G$ and $L_D$. The LCL filter 42 is connected to an electronic switch 44, described below. The electronic switch 44 is controlled by the control unit 40.

The VFD 34 comprises an AC/AC converter 46 including a PWM converter 48 connected via a DC bus 50 to a PWM inverter 52. In this embodiment, the VFD 34 comprises a regenerative drive. The PWM converter 48 comprises a full wave bridge rectifier circuit 46 equipped with active switches 56. Particularly, the PWM converter 48 is configured similar to the PWM converter 12 shown in FIG. 2. The PWM converter 48 is operable to convert three phase AC power at input terminals R, S and T to DC power on the DC bus 50. The DC bus 50 is defined by "plus" and "minus" rails. DC bus capacitors 58 are connected across the DC bus 50. The PWM inverter 52 comprises a DC/AC converter 60. The PWM inverter 52 comprises a pulse width modulation inverter using solid state switching devices connected in a three phase bridge configuration, similar to that shown in FIG. 2, to the DC bus 50 to develop AC power at terminals U, V and W. The switches in the PWM inverter 52 are pulse width modulated by control signals from the control unit 40 using a conventional control scheme. Particularly, the PWM inverter 52 is controlled to create a sinusoidal effect for the induction motor 36. The pulse frequency is typically fixed. The pulse width is varied to vary sinusoidal frequency.

The electronic switch 44 comprises a three phase diode bridge rectifier 62 connected to the "broken end" of the capacitor $C_Y$. The diode bridge rectifier 62 operates as an AC/DC converter and has DC power at a plus side 64 and a minus side 66. The plus side 64 is connected via a damping resistor $R_{DAMPING}$ to a switch S1. An opposite side of the switch S1 is connected to the minus side 66. The switch S1 is controlled by the control unit 40. As such, the switch S1 is selectively controlled by the control unit 40 to selectively open or short a neutral point of the broken wye capacitor $C_Y$, as described more particularly below.

In the described topology, the electronic switch 44, comprising the semiconductor switch S1 with the three-phase diode rectifier bridge 62, is used to open or short the neutral point of the filter capacitor $C_Y$. In cases that need use of damping resistor, the switch S1 can be combined with one resistor $R_{DAMPING}$ instead of three resistors (one for each phase) to reduce size, complexity and cost. For the case where a damping resistor is needed, the value of the DC side resistor should be two times in value compared to the value of the typical AC damping resistor. The relationship between equivalent DC resistance and the 3-phase AC resistor value is based on equating AC power with DC power.

The topology presented in FIG. 4 accomplishes two important tasks. When the PWM converter 48 is NOT running, the ON/OFF control of the PWM active switches 56 from the control unit 40 is typically in the OFF position. The control unit 40 is also used to turn OFF the semiconductor switch S1. Turning OFF S1 during times that the PWM converter 48 is not in operation saves a significant amount of energy that could be lost due to circulating current in the grid side inductor $L_G$ and the filter capacitor $C_Y$.

In cases that require a damping resistor, instead of using three damping resistors, the proposed topology suggests the use of only one equivalent damping resistor in the DC circuit, keeping in mind that the effective damping resistor value, $R_{DAMPING}$ is two times that of the corresponding AC circuit damping resistors discussed above. In many cases, the value of $R_{DAMPING}$ can be adjusted to an optimal value that includes the power loss occurring in the switch S1.

In the circuit of FIG. 4, it should be noted that when the switch S1 is ON, there is some power loss in the switch S1, Selecting a semiconductor switch S1 that has low on-state conduction loss helps in reducing the overall loss and improves the system efficiency. As mentioned above, for cases that require a damping resistor, the extra loss in the switch S1 can be used towards providing damping resistance and so the value of the equivalent DC damping resistor $R_{DAMPING}$ can be adjusted to include the power loss taking place in the switch S1.

The position of the switch S1 in the drive circuit 30 is such that it can also be used to protect the capacitor $C_Y$ from getting over loaded due to a grid fault condition. Typically in wind power systems, whenever there is a grid fault, the wind generator is required to feed the fault for a fixed duration of time. It is possible that during this time, the current flowing through the filter capacitor $C_Y$ to support the fault reactive power requirement exceeds its rating. A current sensor (not shown) can be used in series with the switch S1 and can be constantly monitored for fault conditions. If the current exceeds a predetermined level, the switch S1 can be turned OFF by the control unit 40 to protect the capacitor $C_Y$. This condition can also be used to safely turn off the PWM converter 48.

The diode bridge rectifier 62 can be of rectifier grade. No high speed switching diodes are needed and line frequency grade diodes will suffice. This reduces cost of the added system significantly.

Figure 1:
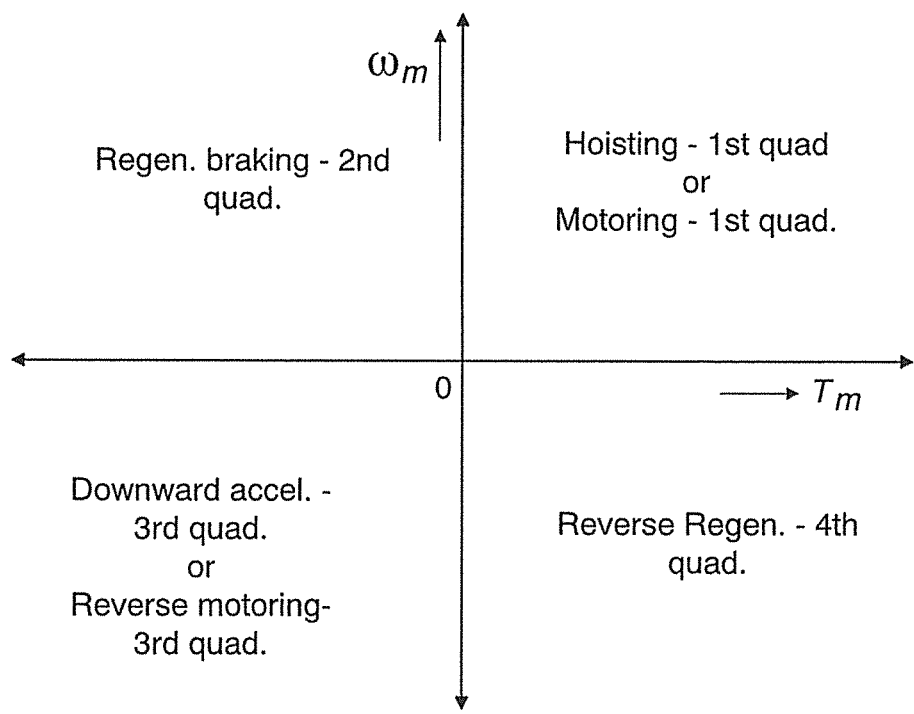
FIG. 1 is a diagram illustrating the four quadrants of operation in a motor drive.
Figure 2:
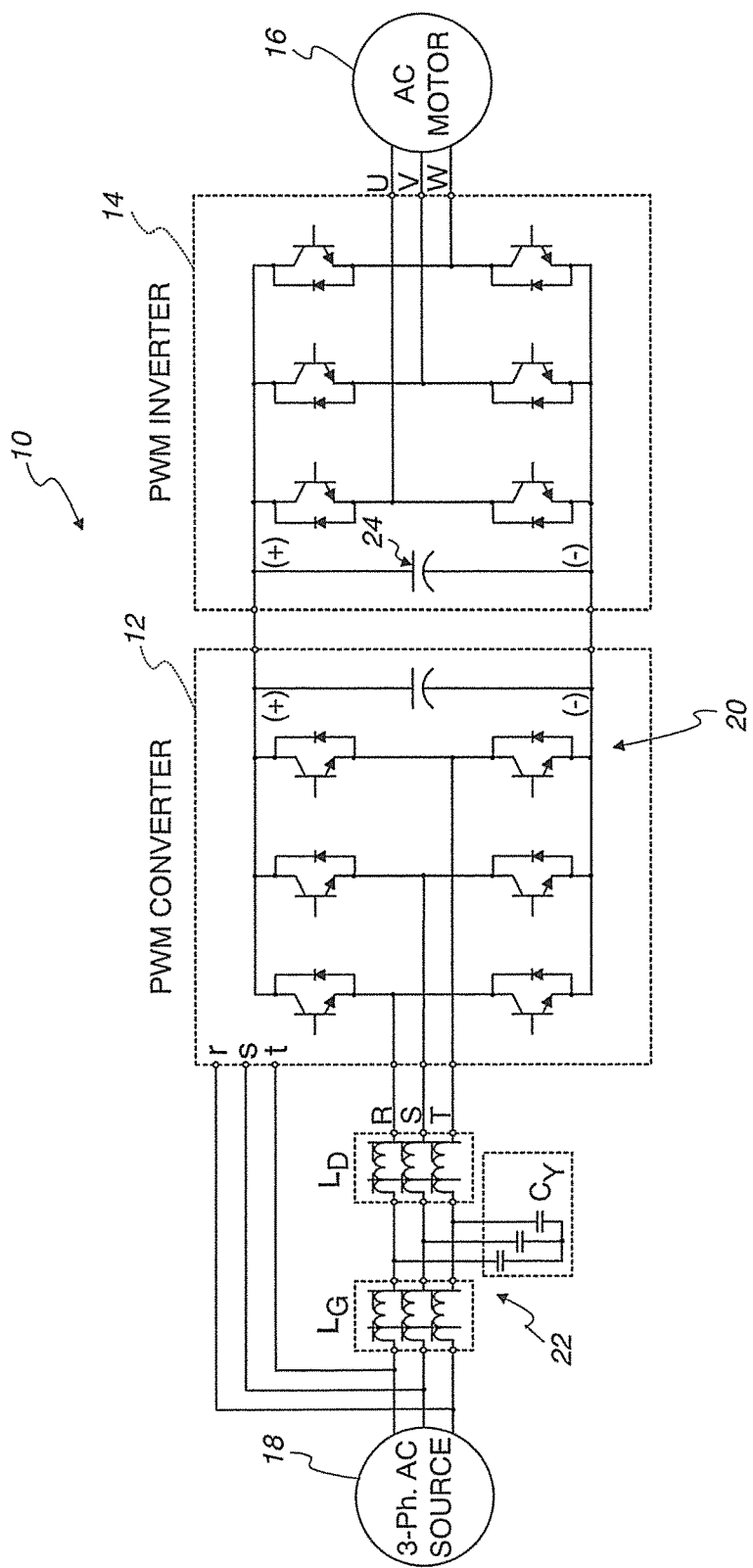
FIG. 2 is a schematic of a prior art regenerative drive.
Figure 3:
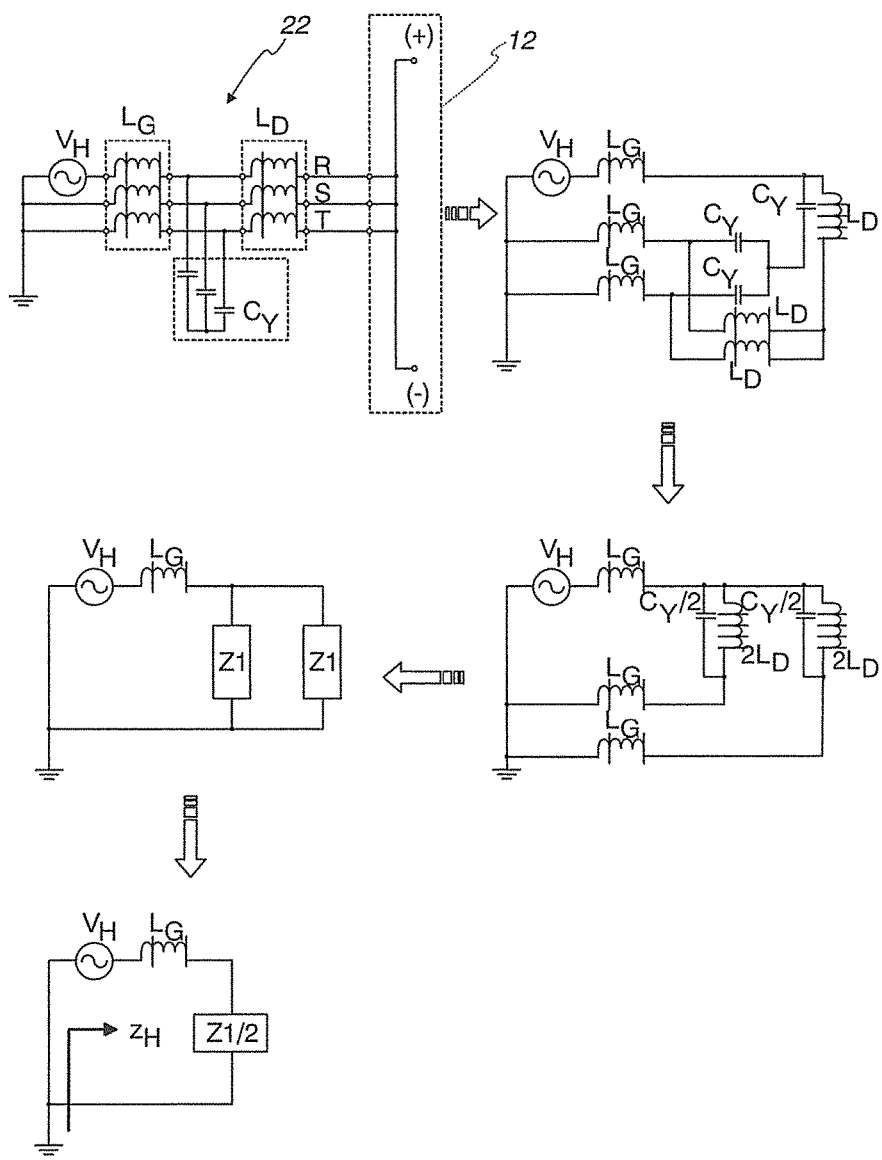
FIG. 3 illustrates equivalent circuitry for the input filter for the drive of FIG. 2.

Similar to the PWM filter shown in FIG. 2, there are many passive filters that are employed in front of diode rectifier based VFDs. These filters are tuned or broad band harmonic filters used for harmonic correction and for improving input power factor. Passive filters consist of passive components like inductors, capacitors, and resistors arranged in a predetermined fashion either to attenuate the flow of harmonic components through them or to shunt the harmonic component into them. Passive filters are of many types—Series Passive filters, Shunt Passive filters, and Low-pass Passive filters.

Figure 5:
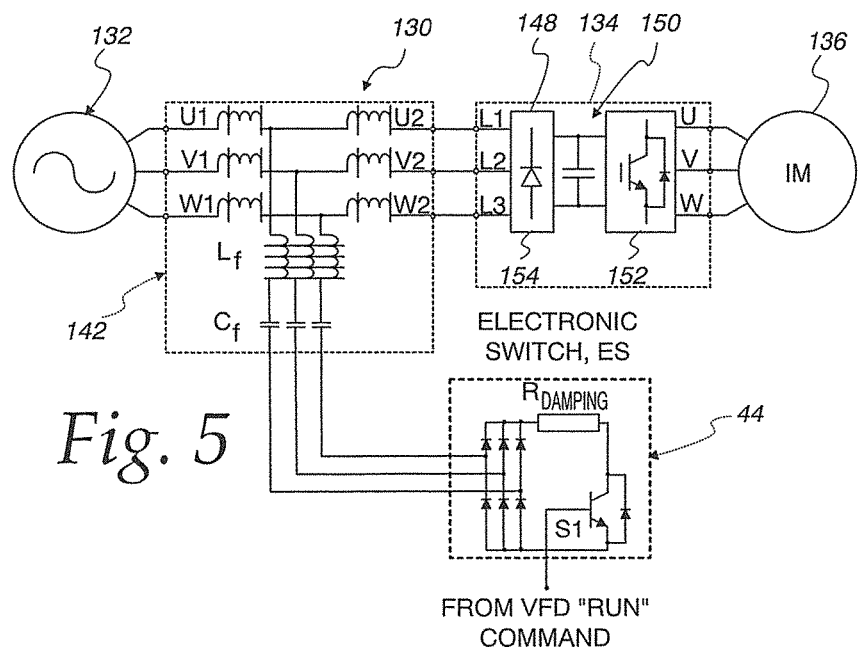
FIG. 5 is an electrical schematic illustrating an electrical switch to eliminate standby power loss in a voltage source inverter.

FIG. 5 illustrates a drive system 130 including an AC source 132 powering a VFD 134 to control an induction motor 136. For simplicity, this circuit, as well as those discussed below, use similar numerals, except being in the 100 series. Thus, the AC source 32 of FIG. 4 corresponds to the AC source 132 of FIG. 5. In general, such components may be similar, other than as described specifically below.

In the circuit of FIG. 5, the VFD 134 comprises a voltage source inverter using a diode bridge rectifier 154 as part of an AC/DC converter 148. An input filter 142 comprises a fifth harmonic passive filter with an inductor $L_f$ and capacitor $C_f$ connected in a broken wye configuration to an electronic switch 44. The electronic switch 44 is identical to that discussed above relative to FIG. 4.

The passive filter shown in FIG. 5 comprises a shunt filter tuned to the 5th harmonic along with series impedance to limit import of harmonics from other sources. One more reactor is placed in between the filter section and the VFD 134 to further reduce the current distortion. All passive filters are associated with circulating current that cause unnecessary power loss. Circulating current in capacitor filters causes high voltage at VFD input terminals, especially at light loads. The capacitor in the passive filter can at times interact with upstream transformer impedance and cause system resonance. The electronic switch 44 is used to disconnect the capacitors $C_f$ in the input LCL filter 142.

Particularly, under idling conditions, when the VFD 134 is not running but remains powered up as in after office hours or after shift hours, it is prudent to disconnect the capacitors $C_f$, so that power is not wasted due to the circulating current between the filter inductor $L_f$ and filter capacitor $C_f$.

By monitoring the capacitor current, one can identify resonance conditions and the capacitor can be quickly disconnected.

Figure 6:
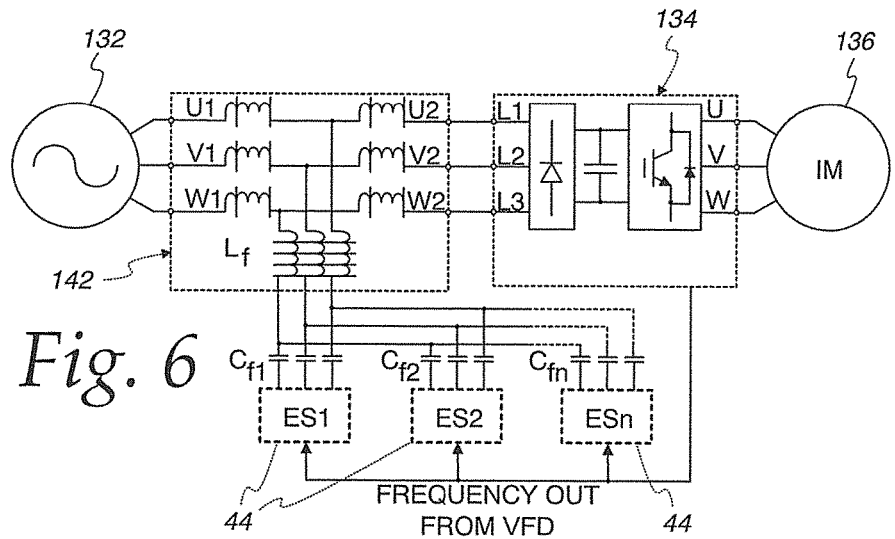
FIG. 6 is a schematic illustrating a combination of electronic switches to allow staging of capacitor banks depending upon the loading level of the variable frequency drive.

To avoid over voltage at the drive terminals under light load conditions, it is prudent to stage capacitor banks to come on based on load level. This is currently being done by many filter manufacturers using contactors. As is known, the contactors are mechanical devices and are subject to wear and tear. Depending on the instant of contact closing and opening, arcing across the contacts are common and deteriorates the life expectancy of the contactors. Contactors are bulky, occupy space, and need relays or other means to turn them ON and OFF. As described herein, staging of capacitors is disclosed without arcing and without the need of bulky contactors and relays. A multiple number of electronic switches 44 connect to multiple capacitor banks ($C_{f1}$, $C_{f2}$, $C_{fN}$), which are then turned ON and OFF by simple gate logic voltages directly from the VFD without the need for any relays. This is shown in FIG. 6.

There are many industrial applications, especially in the Oil and Natural Gas industries, which employ medium voltage motors. These require medium voltage inverters for control. Medium voltage inverters are expensive and are not available in low to medium horsepower ratings, especially below 500 hp. An economical way around this is to step down the incoming medium-voltage to levels acceptable to low-voltage VFDs. The output of the VFD, which is PWM in nature, is converted into a sine wave and is stepped up to medium voltage level using a standard medium voltage transformer, which is then fed into the medium-voltage motor. The reason for using an output sine wave filter is that if PWM waveform is applied directly to a step-up transformer, the high frequency voltage components create excessive heat in the transformer resulting in poor performance and premature transformer winding and/or motor winding failure. Excessive leakage current also results and this may interfere with process control signals.

Another common application of output sine wave filters with PWM drives is for reducing the voltage doubling effect at the motor terminals due to voltage reflection issues.

Figure 7:
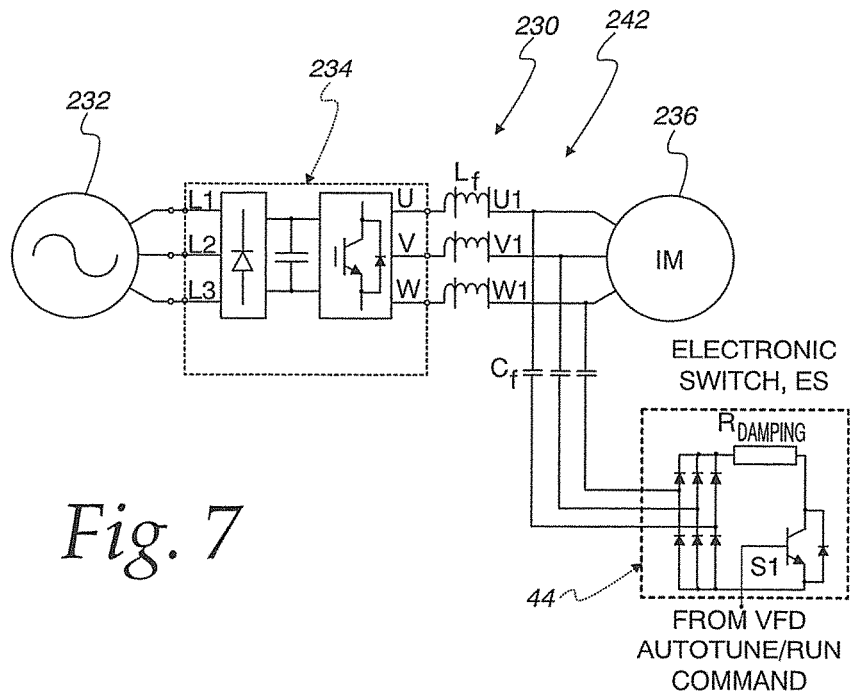
FIG. 7 is an electrical schematic of an output sine wave filter with an electronic switch used for enabling and disabling a filter capacitor network in a variable frequency drive.

To improve the performance of VFDs, it is often required to tune the VFD controller to match with the motor parameters. The matching of the controller with the motor parameters involves injecting signal at various frequencies into the motor and reading the ensuing current signature. The information contained in the current signature in conjunction with the applied voltage waveform allows the matching to occur correctly. When an output PWM filter 242 that has a filter inductor $L_f$ and capacitor $C_f$ as shown in FIG. 7 is used, the matching program does not work and it is imperative to disconnect the filter capacitor $C_f$ to allow for correct matching to occur. Disconnecting the filter capacitor $C_f$ is in many applications logistically not possible or is difficult. The proposed idea of electrically disconnecting the filter capacitor $C_f$ during auto tuning process of the VFD 234 is very helpful to achieve the above mentioned matching of motor parameters with the VFD control parameters. Once the matching process is complete, an electrical signal can be initiated to turn ON the electronic switch 44 and resume normal operation with the PWM filter 242 in circuit. A preferred embodiment of the output sine wave filter 242 with the electronic switch 44 is shown in FIG. 7.

Figure 8:
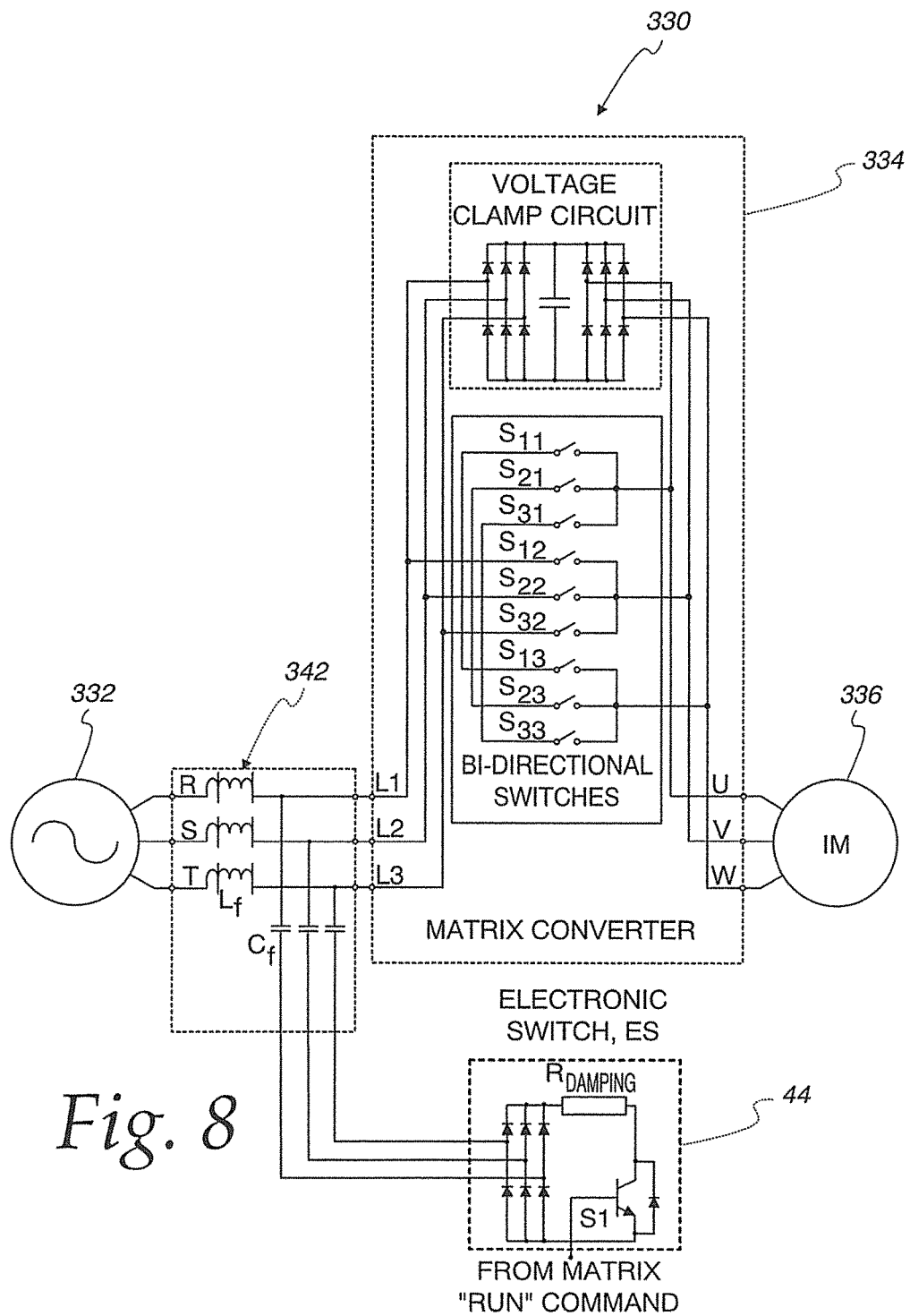
FIG. 8 is an electrical schematic of a matrix converter with circuitry to connect and disconnect input capacitors to conserve energy during idle conditions.

A matrix converter is an AC to AC converter that does not have an intermediate DC bus capacitor for energy storage purposes. Hence, the matrix converter (MC) is a direct power conversion system that can generate variable voltage and variable frequency output from the AC power source. The topology is fully regenerative and has approximately sinusoidal input current with unity power factor. FIG. 8 shows a drive circuit 330 with the matrix converter 344. The drive 330 consists of an input LC filter 342 and nine bi-directional switches S11-S33 without large DC link components. The switches S11-S33 represent bi-directional switches that typically consist of two anti-paralleled devices such as reverse-blocking IGBTs or series connected IGBT-diode pair. IGBTs with reverse blocking capability have advantages of lower power loss and smaller size over conventional series connected IGBT-diode pair. A voltage clamp circuit is used to protect the bi-directional switches S11-S33 from excessive voltage. The bidirectional switches S11-S33 control the output voltages and frequency as well as input currents, by suitable PWM techniques, which keep the input current continuous with low harmonics.

As seen in FIG. 8, a particular motor phase can be fed from one of three input phases, R, S, and T. The choice of input phase that connects to a particular motor phase depends on the instantaneous voltage value of the input phases with respect to each other and the direction of current flowing in the motor phase under consideration. There are two important points that need to be adhered to all the time with matrix converter operation.

Input phases cannot be short circuited. In other words, for a particular motor phase terminal, the incoming switch corresponding to an input phase cannot be turned ON before the outgoing switch connected to a different input phase is completely turned OFF. At any given time, the motor phase cannot be abruptly opened when current is flowing through it. The voltage spike that ensues by interrupting an inductive current can damage the bidirectional switches.

During commutation period, the current transfer from the outgoing phase to the incoming phase is not instantaneous. The four-step commutation process is adopted. The highest voltage differential to allow current flow in the desired direction through a given particular motor phase is appropriately selected, depending on the sensed input voltage. A higher voltage of a phase is used to turn off the switch that has a lower voltage across it. Unfortunately, the switches are not ideal. For example, when S21 is turned ON, the increasing S-phase voltage reverse biases switch S31, assuming that S31 was conducting prior to S21 coming ON. There is a reverse recovery current that flows. In order to accommodate such commutation current pulses (reverse recovery switch currents), input filter capacitors $C_f$ are used. These filter capacitors $C_f$ are physically placed in close proximity to the bidirectional switches to avoid inductive spikes due to lead lengths between the capacitor and the switch.

When filter capacitors $C_f$ are used to absorb the reverse recovery current spikes, it is important to protect these capacitors from other harmonic sources pre existing in the AC system across which they are connected. This work is accomplished by using input filter inductors $L_f$ that isolate the filter capacitors from the input AC source.

Unfortunately, using an inductor with the capacitor also forms a low pass filter circuit and resistors may be needed to damp oscillations caused by preexisting voltage imbalances in the input AC source 332. Moreover, when the matrix converter 334 is in the OFF state but the input power is turned ON, there is a circulating current through the input LC filter 342 that can result in power loss and reduce the overall system efficiency.

The topology presented in FIG. 8 accomplishes two important tasks. The control signal from the matrix converter 334 can be used to turn ON and OFF the semiconductor switch S1. Turning OFF the switch S1 during times that the matrix converter 334 is not in operation, saves significant amount of energy that would otherwise be lost due to circulating current in the filter inductor and filter capacitor.

In cases that require a damping resistor, instead of using three damping resistors, the proposed topology suggests the use of only one equivalent damping resistor in the DC circuit, keeping in mind that the effective damping resistor value, $R_{DAMPING}$ needs to be recalculated based on the value of the input filter inductor and capacitor values. In many cases, the value of $R_{DAMPING}$ can be adjusted to an optimal value that includes the power loss occurring in the switch S1.

There are many more circuits that can benefit from the enable/disable circuit topology proposed here, as will be apparent to those skilled in the art. It is the intent of this application that such circuits are covered under this disclosure.

In the modern era of energy conservation, it is important to be able to disconnect parts of an electrical circuit responsible for energy loss during idling. Whenever the circuit is required to perform normally, the proposed circuits provide a means of bringing back the desired circuit configuration by enabling itself based on a command from the main controller. The proposed topology is very simple to implement and is associated with minimal power loss during normal operation. In many instances that involve filter capacitors, the conduction loss of the switch can be combined with external damping resistors to provide small sized, low cost, damping alternatives.

As such, each of the embodiments described herein illustrates the method for saving energy with active PWM rectifiers in a regenerative drive. This method generally comprises controlling the switch S1 to selectively open or short a neutral point of a capacitor broken wye configuration.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. The method for saving energy with active PWM rectifiers in a regenerative drive, comprising:
   providing a power conversion system comprising an active PWM rectifier having an input for receiving AC power from a multi-phase AC source and converting the AC power to DC power and a PWM inverter for converting the DC power to AC power to drive a motor, the PWM rectifier and PWM inverter being controlled to control flow of power into and out of the AC source; and
   providing a filter circuit connected between the multi phase AC source and the power conversion system and comprising at least one inductor per phase and at least one capacitor per phase, the capacitors connected in a broken wye configuration with a first end of each capacitor operatively connected to one of the phases and a second end of each capacitor connected via a three phase diode bridge rectifier to a switch; and
   controlling the switch to selectively open or short a neutral point of the capacitor broken wye configuration.

2. The method of claim 1 wherein the switch is turned off if the PW rectifier and PWM inverter are in an off mode.

3. The method of claim 1 wherein the switch provides a select power loss for damping.

4. The method of claim 1 wherein further comprising providing a damping resistor between the switch and a DC side of the diode bridge.

5. The method of claim 1 wherein the filter circuit comprises capacitor banks and each capacitor bank is connected via a three phase diode bridge rectifier to a switch.

6. The method of claim 1 wherein the switch is turned off responsive to fault conditions.

7. The method for saving energy with PWM converters in a regenerative drive, comprising:
   providing a power conversion system comprising an active PWM converter having an input for receiving AC power from a multi phase AC source and converting the AC power to variable voltage and variable frequency for driving a multi phase AC motor, the PWM converter being controlled to control flow of power into and out of the AC source;
   providing a filter circuit connected to the PWM converter and comprising at least one inductor per phase and at least one capacitor per phase, the capacitors connected in a broken wye configuration with a first end of each capacitor operatively connected to one of the phases and a second end of each capacitor connected via a three phase diode bridge rectifier to a switch; and
   controlling the switch to selectively open or short a neutral point of the capacitor broken wye configuration.

8. The method of claim 7 wherein the switch is turned off if the PWM rectifier and PWM inverter are in an off mode.

9. The method of claim 7 wherein the switch provides a select power loss for damping.

10. The method of claim 7 wherein further comprising providing a damping resistor between the switch and a DC side of the diode bridge.

11. The method of claim 7 wherein the filter circuit comprises capacitor banks and each capacitor bank is connected via a three phase diode bridge rectifier to a switch.

12. The method of claim 7 wherein the switch is turned off responsive to fault conditions.

* * * * *